United States Patent [19]
DeAnna

[11] Patent Number: 5,886,256
[45] Date of Patent: Mar. 23, 1999

[54] ICE DETECTION SENSOR

[75] Inventor: Russell DeAnna, Westlake, Ohio

[73] Assignee: The United States of America as represented by the Secretary of the Army, Washington, D.C.

[21] Appl. No.: 45,960

[22] Filed: Mar. 18, 1998

[51] Int. Cl.⁶ .................................................... G01N 2/00
[52] U.S. Cl. ...................... 73/170.26; 324/671; 324/688; 324/689; 340/580; 340/962
[58] Field of Search .................. 73/170.26; 324/664, 324/671, 688, 689, 694; 340/580, 962

[56] References Cited

U.S. PATENT DOCUMENTS

| | | | |
|---|---|---|---|
| 3,238,773 | 3/1966 | Leigh, Jr. ............................. | 73/170.26 |
| 4,745,803 | 5/1988 | Haavasoja ............................ | 73/170.26 |
| 4,766,369 | 8/1988 | Weinstein . | |
| 4,873,510 | 10/1989 | Khurgin . | |
| 4,897,597 | 1/1990 | Whitener ............................ | 73/170.26 X |
| 5,398,547 | 3/1995 | Gerardi et al. ....................... | 73/170.26 |
| 5,523,959 | 6/1996 | Seegmiller ........................... | 73/170.26 X |
| 5,551,288 | 9/1996 | Gerardi et al. ....................... | 73/170.26 |
| 5,569,850 | 10/1996 | Rauckhorst III ...................... | 73/170.26 |
| 5,811,693 | 9/1998 | Okada .................................. | 73/862.043 |

*Primary Examiner*—Elizabeth L. Dougherty
*Attorney, Agent, or Firm*—Paul S. Clohan; U. John Biffoni

[57] ABSTRACT

An ice detection sensor for placement on a surface of a body subject to icing includes a Pyrex glass or silicon block for disposal on the body surface, the block having a cavity therein, a diaphragm bonded to the silicon block and covering the cavity, a drive electrode disposed in the cavity and operable to deflect the diaphragm upon application of voltage between the drive electrode and the diaphragm, and a second electrode operable to detect motion of the diaphragm. The diaphragm is movable by the drive electrode when there is water covering the diaphragm and when the diaphragm is not covered and the diaphragm is not movable by the drive electrode when there is ice covering the diaphragm. The second electrode is adapted to detect movement and non-movement of the diaphragm, whereby to detect whether ice covers the diaphragm.

15 Claims, 2 Drawing Sheets

ICE DETECTION SENSOR

STATEMENT OF GOVERNMENT INTEREST

The invention described herein may be manufactured, used and licensed by or for the Government for Governmental purposes without the payment to us of any royalty thereon.

BACKGROUND OF THE INVENTION

1. Field of the Invention

The invention relates to sensors for detecting the presence of ice on structures, as for example, aircraft, roads, bridges, and equipment.

2. Description of the Prior Art

It is known to provide sensors to detect the presence of ice on various structures. Prior types of such sensors include hot-wire, vibrating probe, pulse-echo, microwave and pressure array types. Such devices typically are large, expensive, consume significant power, and disrupt the flow field around structures such as aircraft. Further, such devices typically are deployed for single-point measurements, such as one per aircraft, for example, providing a single reading for the entire aircraft. The sensors activate the de-icing of the whole aircraft, or other structure, without regard to local conditions wherein ice may not be present.

It is deemed desirable to have available an ice detector sensor which is small and relatively inexpensive, so that large numbers of sensors can be made and used at very low cost. It is further desired to have sensors which are of negligible weight and of a configuration so as not to disrupt flow over the surface on which the sensor is mounted. There is a need for such sensors as are adapted to be spread upon a surface to provide knowledge of ice conditions in a number of local areas of the surface. Only those local areas covered with ice would then be de-iced, saving power and de-ice chemicals in utilization of the de-icing system.

SUMMARY OF THE INVENTION

An object of the invention is, therefore, to provide an ice-detection sensor of small size, low weight, and inexpensive construction which may be used in large numbers to obtain a survey of ice conditions in various local areas of a structure.

A further object of the invention is to provide such an ice-detecting sensor configured to provide a very limited profile on the structure and thereby minimalize disturbance of flow over the surface of the structure.

With the above and other objects in view, as will hereinafter appear, a feature of the present invention is the provision of a ice detection sensor for placement on a surface of a body subject to icing, the sensor comprising a block of Pyrex glass or silicon for disposal on the body surface, the block having a cavity therein, a diaphragm bonded to the block and covering the cavity, a drive electrode disposed in the cavity and operable to deflect the diaphragm upon application of voltage between the drive electrode and the diaphragm, and a second electrode operable to detect motion of the diaphragm. The diaphragm is movable by the drive electrode when there is water covering the diaphragm and when the diaphragm is not covered and the diaphragm is not movable by the drive electrode when there is ice covering the diaphragm. The second electrode is adapted to detect movement and non-movement of the diaphragm, whereby to detect whether ice covers the diaphragm.

The above and other features of the invention, including various novel details of construction and combinations of parts, will now be more particularly described with reference to the accompanying drawings and pointed out in the claims. It will be understood that the particular device embodying the invention is shown by way of illustration only and not as a limitation of the invention. The principles and features of this invention may be employed in various and numerous embodiments without departing from the scope of the invention.

BRIEF DESCRIPTION OF THE DRAWINGS

Reference is made to the accompanying drawings in which is shown an illustrative embodiment of the invention, from which its novel features and advantages will be apparent.

In the drawings.

DESCRIPTION OF THE PREFERRED EMBODIMENTS

Figure 1:
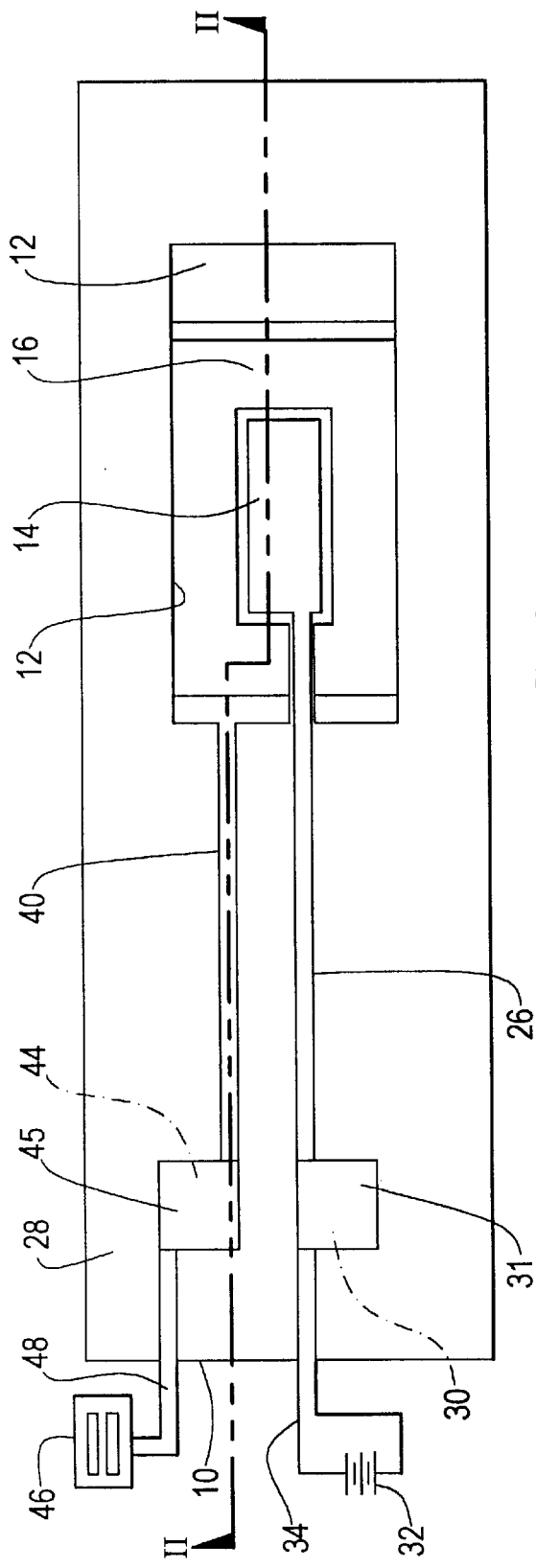
FIG. 1 is a top plan view of one form of sensor, less a diaphragm portion for clarity, illustrative of an embodiment of the invention.
Figure 2:
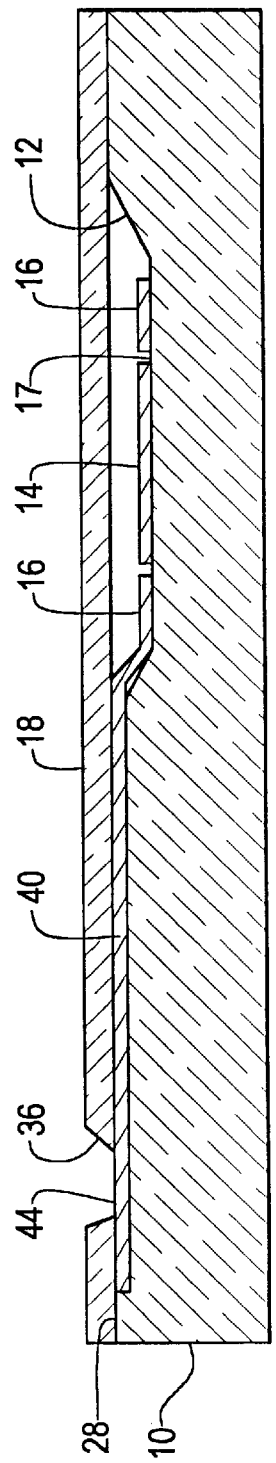
FIG. 2 is a sectional view taken along line II—II of FIG. 1 and showing the diaphragm portion in place.

Referring to FIGS. 1 and 2, it will be seen that the illustrative sensor includes a Pyrex glass or silicon block 10 for placement on a surface of a body subject to icing. The block 10 is provided with a cavity 12 in which are disposed an aluminum drive electrode 14 and a second aluminum electrode 16. As shown in FIG. 2, the electrodes may be of a planar configuration and the second electrode 16 may surround the drive electrode 14 in the plane of the drive electrode. The electrodes 14, 16 preferably are sputtered on a bottom surface 17 of the cavity 12.

As shown in FIG. 2, a diaphragm 18, preferably of p+ silicon with boron doping, is bonded to the Pyrex glass or silicon block 10, completely covering the cavity 12 and enclosing the drive electrode 14 and the second electrode 16.

Figure 3:
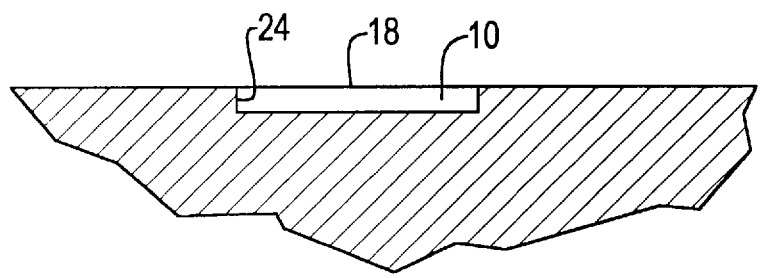
FIG. 3 is a sectional diagrammatic view showing the sensor disposed within a recess provided in a structure.
Figure 4:
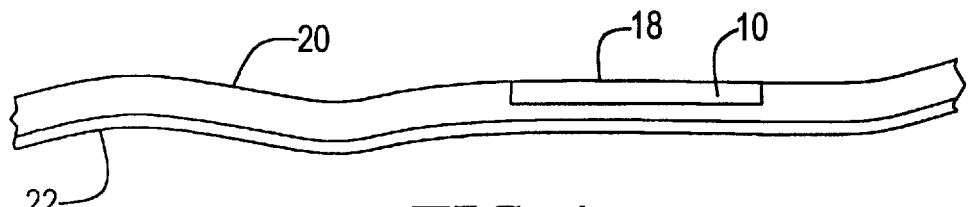
FIG. 4 is a diagrammatic illustration of the sensor of FIG. 1 disposed in a flexible circuit.

The sensor is fabricated by integrated-circuit batch techniques, known in the art, facilitating manufacture of large numbers at very low cost, as in the case of silicon chips. The sensors are of rectangular configuration in plan view (FIG. 1), and are preferably about 16 mm$^2$ in area, and of a thickness of about 250–500 microns. Thus, the sensors can be mounted on a flexible circuit 20 (FIG. 4) which may be attached, as by tape, adhesive, or the like 22, to structure surfaces without the surfaces having to be machined. Because of their low profiles, the sensors do not substantially disrupt fluid flow over the surface to which they are attached. In the event the sensors are used on high-speed aircraft or other vehicles requiring a super-smooth surface, the sensors may be positioned in recesses 24 (FIG. 3) machined into the surface and adapted to receive the Pyrex glass or silicon block 10.

The sensor is provided with an electrically conductive interconnect 26 extending from the drive electrode 14, through a portion of the block 10, and coplanar with a surface 28 of the block, terminating in a pad 30 on the surface 28. The pad 30 is connectable to a power source 32 by circuitry 34, through a wire bonding 31, shown schematically in FIG. 1.

Similarly, the sensor is provided with an electrically conductive interconnect 40 extending from the second electrode 16, through a portion of the block 10, coplanar with the surface 28 of the block, terminating in a pad 44 on the surface 28. The pad 44 is connectable to a receiver 46 by circuitry 48, through a wire bonding 45, shown schematically in FIG. 1, for receiving signals from the second electrode 16. The diaphragm 18 is bonded to the surface 28 of the block 10 and is provided with openings 36 which render accessible the pads 30, 44.

In operation, a voltage is applied between the drive electrode 14 and the diaphragm 18 by way of the power source circuitry 34, the wire bonding 31, the pad 30, and the sensor interconnect 26. The voltage applied produces an electrostatic force which deflects the diaphragm 18 toward the electrode 14, if the diaphragm is not covered, or is covered by a liquid. The second electrode 16 detects the movement of the diaphragm 18 as a change in capacity therebetween. The second electrode 16 sends a signal by way of the interconnect 40, the pad 44, the wire bonding 45, and the circuitry 48, to the receiver 46, reporting, in this instance, a "no ice" situation.

However, when ice covers the diaphragm 18, the diaphragm does not deflect, and the second electrode 16 fails to report "no ice" to the receiver 46, whereupon the receiver manifests an indication of "ice present".

There is thus provided an ice detection sensor which is very small, light-weight, inexpensive, and of low profile, enabling use of multiple sensors on a structure to indicate local areas thereon having ice present and other local areas having no ice present.

It is to be understood that the present invention is by no means limited to the particular construction herein disclosed and/or shown in the drawings, but also comprises any modifications or equivalents within the scope of the claims.

What is claimed is:

1. An ice detection sensor for placement on a surface of a body subject to icing, said sensor comprising:

a block of a selected one of Pyrex glass and silicon for disposal on the body surface, said block having a cavity therein;

a diaphragm bonded to said block and covering said cavity;

a drive electrode disposed in said cavity and operable to deflect said diaphragm upon application of a voltage between said drive electrode and said diaphragm; and a second electrode operable to detect motion of said diaphragm;

wherein said diaphragm is movable by said drive electrode when there is water covering said diaphragm and when said diaphragm is not covered, and wherein said diaphragm is not movable by said drive electrode when there is ice covering said diaphragm, and said second electrode is adapted to detect movement and non-movement of said diaphragm, whereby to detect whether ice covers said diaphragm.

2. The sensor in accordance with claim 1 wherein said diaphragm is of p+ silicon with boron doping.

3. The sensor in accordance with claim 2 wherein said electrodes are of aluminum.

4. The sensor in accordance with claim 1 for placement in a recess in the surface of the body, wherein said block is adapted for disposal in the body surface recess.

5. The sensor in accordance with claim 1 for attachment to a flexible circuit adapted for attachment to the surface.

6. The sensor in accordance with claim 3 wherein said sensor is of about sixteen square millimeters in area.

7. The sensor in accordance with claim 6 wherein said sensor is of a rectangular configuration in plan view.

8. The sensor in accordance with claim 1 wherein said sensor is about 250–500 microns in thickness.

9. The sensor in accordance with claim 1 and further comprising an electrically conductive interconnect extending from said drive electrode and through a portion of said block to a surface of said block and connectable to a power source.

10. The sensor in accordance with claim 9 and further comprising a second electrically conductive interconnect extending from said second electrode and through a portion of said block to said surface of said block and connectable to a receiver for receiving signals from said second electrode.

11. The sensor in accordance with claim 10 wherein said diaphragm is bonded to a top surface of said block.

12. The sensor in accordance with claim 11 wherein said diaphragm is provided with openings therein spaced from said cavity, ends of said interconnects spaced from said electrode are each provided with an electrically conductive pad, and said openings are disposed over said pads, respectively.

13. The sensor in accordance with claim 1 wherein said second electrode surrounds said drive electrode in a plane of said drive electrode.

14. The sensor in accordance with claim 13 wherein said electrodes are of a planar configuration and are disposed on a bottom surface of said cavity.

15. The sensor in accordance with claim 14 wherein said electrodes are sputtered on said bottom surface of said cavity.

* * * * *